United States Patent
Miehe et al.

(10) Patent No.: US 10,080,990 B2
(45) Date of Patent: Sep. 25, 2018

(54) AIR DRYER

(71) Applicant: Graham-White Manufacturing Company, Salem, VA (US)

(72) Inventors: Donald Miehe, Salem, VA (US);
Niteen Patel, Salem, VA (US); J. Hunter Babcock, Salem, VA (US);
Benjamin Wisdom, Salem, VA (US);
William Ginder, Salem, VA (US);
David Colatosti, Salem, VA (US);
Jonathan McGlumphy, Salem, VA (US)

( * ) Notice: Subject to any disclaimer, the term of this patent is extended or adjusted under 35 U.S.C. 154(b) by 192 days.

(21) Appl. No.: 14/874,440

(22) Filed: Oct. 4, 2015

(65) Prior Publication Data

US 2017/0095767 A1    Apr. 6, 2017

(51) Int. Cl.
*B01D 53/02*    (2006.01)
*B01D 53/04*    (2006.01)
*B01D 53/26*    (2006.01)

(52) U.S. Cl.
CPC ..... *B01D 53/0454* (2013.01); *B01D 53/0446* (2013.01); *B01D 53/261* (2013.01); *B01D 53/266* (2013.01); *B01D 2257/80* (2013.01)

(58) Field of Classification Search
CPC ............ B01D 2257/80; B01D 53/0446; B01D 53/0454; B01D 53/261; B01D 53/266
See application file for complete search history.

(56) References Cited

U.S. PATENT DOCUMENTS

| | | | |
|---|---|---|---|
| 3,775,946 | A | 12/1973 | Brazzel |
| 4,052,178 | A | 10/1977 | Frantz |
| 4,525,183 | A | 6/1985 | Cordes et al. |
| 4,546,442 | A | 10/1985 | Tinker |
| 4,806,134 | A | 2/1989 | Lhota |
| 5,027,529 | A | 7/1991 | Cramer et al. |
| 5,145,495 | A | 9/1992 | Elamin |
| 5,209,764 | A | 5/1993 | Eberling |
| 5,755,854 | A | 5/1998 | Nanaji |
| 5,983,651 | A | 11/1999 | Huang |

(Continued)

FOREIGN PATENT DOCUMENTS

| | | |
|---|---|---|
| JP | 2009-517611 A | 4/2009 |
| JP | 2010-017618 A | 1/2010 |

(Continued)

OTHER PUBLICATIONS

International Search report for International Application No. PCT/US2013/067166 dated Jan. 6, 2014.

(Continued)

*Primary Examiner* — Christopher P Jones
(74) *Attorney, Agent, or Firm* — Steve LeBlanc LLC.

(57) ABSTRACT

An air dryer includes a first flow path through the air dryer and a second flow path through the air dryer in parallel with the first flow path. A diverter valve has a first position that provides fluid communication to the first flow path and a second position that provides fluid communication to the second flow path. A system parameter signal is reflective of fluid flow through the air dryer, and a controller receives the system parameter signal and produces a first control signal based on the system parameter signal. The first control signal controls the position of the diverter valve.

16 Claims, 5 Drawing Sheets

(56) References Cited

U.S. PATENT DOCUMENTS

| | | |
|---|---|---|
| 6,581,297 B1 | 6/2003 | Ginder |
| 6,719,825 B2 | 4/2004 | Wedge et al. |
| 7,608,132 B2 | 10/2009 | Fornof et al. |
| 8,740,316 B2 | 6/2014 | Schal |
| 8,828,127 B2 | 9/2014 | Asmis |
| 8,894,752 B2 | 11/2014 | Ginder |
| 2005/0283282 A1* | 12/2005 | Pervaiz ............... B01D 53/261 701/19 |
| 2006/0080981 A1 | 4/2006 | King et al. |
| 2007/0177983 A1 | 8/2007 | Levan et al. |
| 2008/0173030 A1 | 7/2008 | Levan et al. |
| 2009/0049983 A1 | 2/2009 | Thelen et al. |
| 2011/0052419 A1 | 3/2011 | Bordacs et al. |
| 2011/0259189 A1 | 10/2011 | Diekmeyer et al. |
| 2011/0278804 A1 | 11/2011 | Folchert et al. |
| 2012/0012005 A1 | 1/2012 | Burke |
| 2013/0192464 A1 | 8/2013 | Asmis |
| 2014/0237962 A1 | 8/2014 | Ginder |
| 2014/0250930 A1* | 9/2014 | Unezaki ............... B01D 53/261 62/151 |
| 2014/0345153 A1 | 11/2014 | Pahwa et al. |
| 2015/0251645 A1 | 9/2015 | Pfefferl et al. |

FOREIGN PATENT DOCUMENTS

| | | |
|---|---|---|
| KR | 10-2006-0075882 A | 2/2008 |
| KR | 10-2006-0116750 A | 3/2008 |
| WO | WO2014133596 A1 | 9/2014 |

OTHER PUBLICATIONS

Desiccant Air Dryers Heatless, Heated and Heated Blower, 2007 Ingersoll-Rand Company Limited, 38449732, Form 3508, p. 8.
International Search Report for International Application No. PCT/US2016/052414 dated Jan. 2, 2017.

* cited by examiner

AIR DRYER

FIELD OF THE INVENTION

The present invention generally involves an air dryer, such as may be incorporated into a compressed air system to remove moisture and other contaminants from compressed air.

BACKGROUND OF THE INVENTION

Compressed air is commonly used to perform a myriad of functions. For example, compressed air may be used to displace water in submarine ballast tanks to increase the buoyancy of the submarine, to operate brakes on locomotives and trucks, or to pneumatically operate valves. In each case, the compressed air may include moisture and other particulate contaminates which, if not removed, may accelerate fouling, corrosion, and other interference with the equipment.

Various air dryers are known in the art to remove moisture and particulate contaminates from the compressed air. An air dryer typically includes various combinations of filters and moisture separators to clean and dry the compressed air before it reaches the equipment. For equipment that requires a continuous supply of compressed air, the air dryer may include duplicate flow paths arranged in parallel so that one flow path may remain on-line to purify the compressed air at all times while the other flow path may be taken off-line to regenerate the filters and moisture separators. The off-line flow path may be regenerated by diverting a portion of the compressed air through the off-line flow path to purge the filters and moisture separators to atmosphere and then pressurizing the off-line flow path before returning it to service.

The cycle time between the parallel flow paths and the purge time of the filters and moisture separators directly affects the anticipated lifetime of the air dryer components as well as the overall efficiency and performance of the air dryer. If the cycle time is too long, the filters and moisture separators in the on-line flow path may become excessively saturated with particulates and moisture, adversely affecting the performance of the air dryer. Conversely, if the cycle time is too short, the increased switching between parallel flow paths will result in excessive wear to the valves and other moving components in the air dryer. Similarly, an excessively long purge time wastes compressed air, and an insufficient purge time may not adequately regenerate the filters and moisture separators.

In many air dryers, the cycle time and purge time are pre-selected based on anticipated operating and ambient conditions. However, changes in the operating conditions and/or ambient conditions may result in the pre-selected cycle time and/or purge time being less than optimum. Therefore, an air dryer that utilizes operating conditions and/or ambient conditions to enhance the quality of air produced and/or reduce energy consumption would be useful.

BRIEF DESCRIPTION OF THE INVENTION

Aspects and advantages of the invention are set forth below in the following description, or may be obvious from the description, or may be learned through practice of the invention.

One embodiment of the present invention is an air dryer that includes a first flow path through the air dryer and a second flow path through the air dryer in parallel with the first flow path. A diverter valve has a first position that provides fluid communication to the first flow path and a second position that provides fluid communication to the second flow path. A system parameter signal is reflective of fluid flow through the air dryer, and a controller receives the system parameter signal and produces a first control signal based on the system parameter signal. The first control signal controls the position of the diverter valve.

Another embodiment of the present invention is an air dryer that includes a first flow path through the air dryer and a first exhaust valve in the first flow path, wherein the first exhaust valve has an open position that permits fluid flow out of the first flow path and a shut position that prevents fluid flow out of the first flow path. A second flow path through the air dryer in parallel with the first flow path includes a second exhaust valve, wherein the second exhaust valve has an open position that permits fluid flow out of the second flow path and a shut position that prevents fluid flow out of the second flow path. A system parameter signal is reflective of fluid flow through the air dryer, and a controller receives the system parameter signal and produces a first control signal based on the system parameter signal. The first control signal controls the position of at least one of the first or second exhaust valves.

In yet another embodiment of the present invention, an air dryer includes a first flow path through the air dryer, and the first flow path includes a first exhaust valve having an open position that permits fluid flow out of the first flow path and a shut position that prevents fluid flow out of the first flow path. A second flow path through the air dryer in parallel with the first flow path includes a second exhaust valve having an open position that permits fluid flow out of the second flow path and a shut position that prevents fluid flow out of the second flow path. A diverter valve has a first position that provides fluid communication to the first flow path and a second position that provides fluid communication to the second flow path. A system parameter signal is reflective of fluid flow through the air dryer, and a controller receives the system parameter signal and produces a first control signal based on the system parameter signal. The first control signal controls the position of at least one of the diverter valve, the first exhaust valve, or the second exhaust valve.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid normally flows, and "downstream" refers to the direction to which the fluid normally flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include an air dryer that may be incorporated into a compressed air system to remove moisture and other contaminants from compressed air. The air dryer generally includes multiple flow paths arranged in parallel, and each flow path includes an exhaust valve. Each flow path may also include various means for removing moisture and/or particulate contaminates. The means for removing moisture and/or particulates may include various combinations of filters and/or moisture separators to clean and dry the compressed air. The air dryer may also include a diverter valve having a first position that provides fluid communication to one flow path and a second position that provides fluid communication to the other flow path. An interlock may be operably connected to the diverter valve and the exhaust valves to prevent positioning the diverter valve to either flow path when the associated exhaust valve is in the open position.

Figure 1:
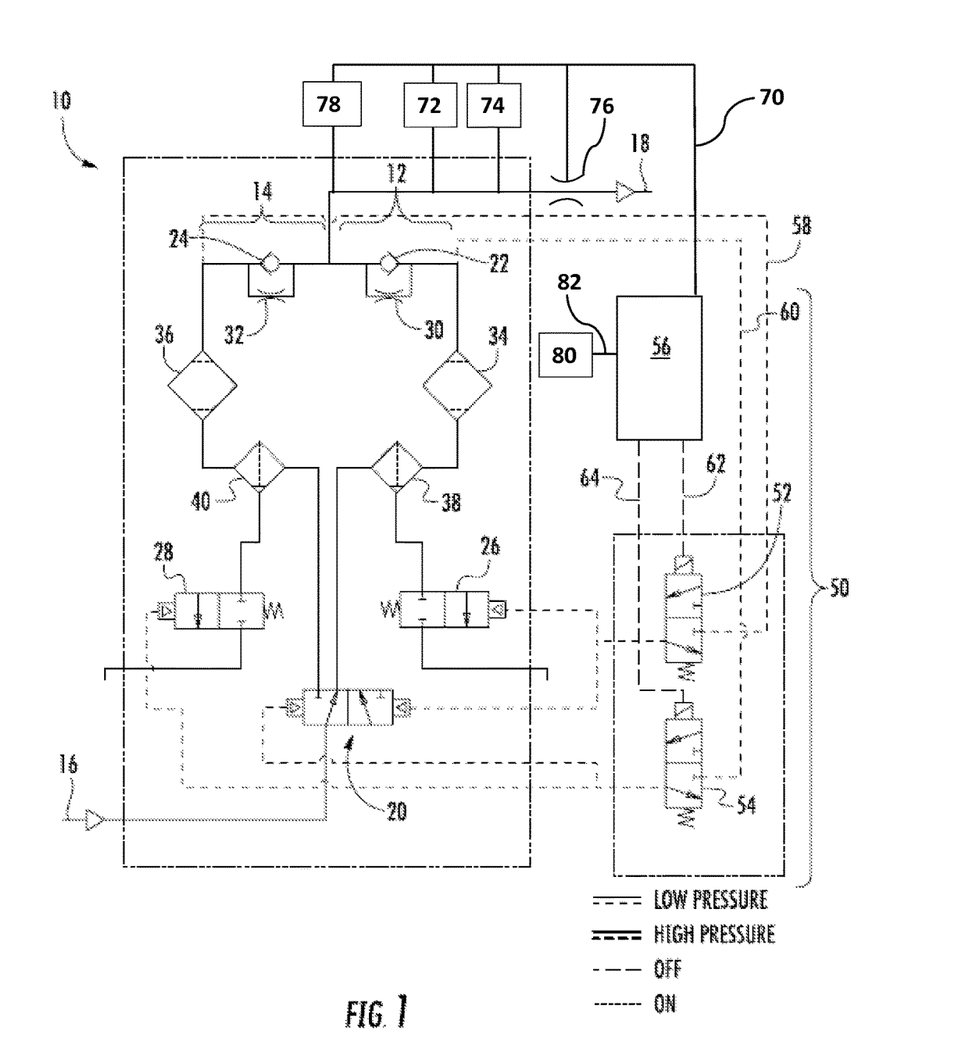
FIG. 1 is a schematic diagram of an air dryer according to an embodiment of the present invention without pressure.

FIG. 1 provides a schematic diagram of an air dryer 10 according to an embodiment of the present invention without pressure, and FIGS. 2-5 provide a schematic diagram of the air dryer shown in FIG. 1 during various modes of operation. As shown, the air dryer 10 generally includes first and second flow paths 12, 14, although additional flow paths may be included and are within the scope of the present invention. The first and second flow paths 12, 14 are arranged in parallel between an inlet 16 and an outlet 18, and a diverter valve 20 has a first position (shown in FIGS. 1-3) that provides fluid communication to the first flow path 12 and a second position (shown in FIGS. 4 and 5) that provides fluid communication to the second flow path 14. In the particular embodiment shown in FIGS. 1-5, the diverter valve 20 is located at the inlet 16; however, in alternate embodiments, the diverter valve may be located at the outlet 18. In this manner, the diverter valve 20 aligns one flow path with the inlet 16 and outlet 18 while the other flow path is being purged of filtered fluid.

Each flow path 12, 14 includes a check valve 22, 24 proximate to the outlet 18 that prevents fluid flow into the flow path and an exhaust valve 26, 28 having an open position that permits fluid flow out of the flow path and a shut position that prevents fluid flow out of the flow path. Each exhaust valve 26, 28 may be biased on the shut position. A bypass orifice 30, 32 in each flow path 12, 14 provides fluid communication around the respective check valves 22, 24 in either direction. In addition, each flow path 12, 14 includes various means for removing moisture and/or particulate from the flow path. The structure for removing moisture and/or particulate may include various combinations of filters and/or moisture separators to clean and dry the compressed air. In the exemplary embodiment shown in FIG. 1, the structure for removing moisture from the compressed air is a desiccant filter 34, 36 in each flow path 12, 14. In addition, each flow path 12, 14 includes a coalescing filter 38, 40 that removes particulate contamination and/or collects moisture from the desiccant filters 34, 36.

An interlock 50 is operably connected to the diverter valve 20 and the exhaust valves 26, 28 in each flow path 12, 14. The interlock 50 prevents positioning the diverter valve 20 to the first position (shown in FIGS. 1-3) when the first exhaust valve 26 is in the open position and prevents positioning the diverter valve 20 to the second position (shown in FIGS. 4 and 5) when the second exhaust valve is in the open position. The interlock 50 may include various combinations of manual or remotely operated control valves that enable operation of the diverter valve 20 and exhaust valves 26, 28 based on pressure sensed in the flow paths 12, 14. In the embodiment shown in FIG. 1, for example, the interlock 50 includes first and second control air valves 52, 54 and a controller 56. The control air valves 52, 54 may be solenoid operated valves biased in the shut position. A first sensing line 58 connects the first control air valve 52 to the second flow path 14 upstream from the second check valve 24. When open, the first control air valve 52 provides fluid communication from upstream of the second check valve 24 to the diverter valve 20 and the first exhaust valve 26. Similarly, a second sensing line 60 connects the second control air valve 54 to the first flow path 12 upstream from the first check valve 22. When open, the second control air valve 54 enables fluid communication from upstream of the first check valve 22 to the diverter valve 20 and the second exhaust valve 28. At pre-determined intervals, the controller 56 may to send a control signal 62, 64 to each control air valve 52, 54 to actuate the solenoid and open the control air valve 52, 54. In this manner, air pressure from the opposite side flow path provides pilot air pressure through the control air valves 52, 54 to reposition the diverter valve 20 and open the respective exhaust valves 26, 28. The operation of the control air valves 52, 54 and controller 56 will be described more fully with respect to FIGS. 2-5.

Operation of the air dryer 10 will now be described with respect to FIGS. 2-5. The controller 56 controls the cycle time between using one flow path to dry and clean the compressed air (i.e., the on-line flow path) while the other flow path purges moisture and otherwise regenerates (i.e., the off-line flow path). For example, the controller 56 may be programmed to rotate cycles at pre-determined intervals. During the first portion of each cycle, referred to as the purge time, the controller 56 may be programmed to purge the off-line flow path of moisture before allowing the off-line flow path to increase pressure before being switched to becoming the on-line flow path.

Figure 2:
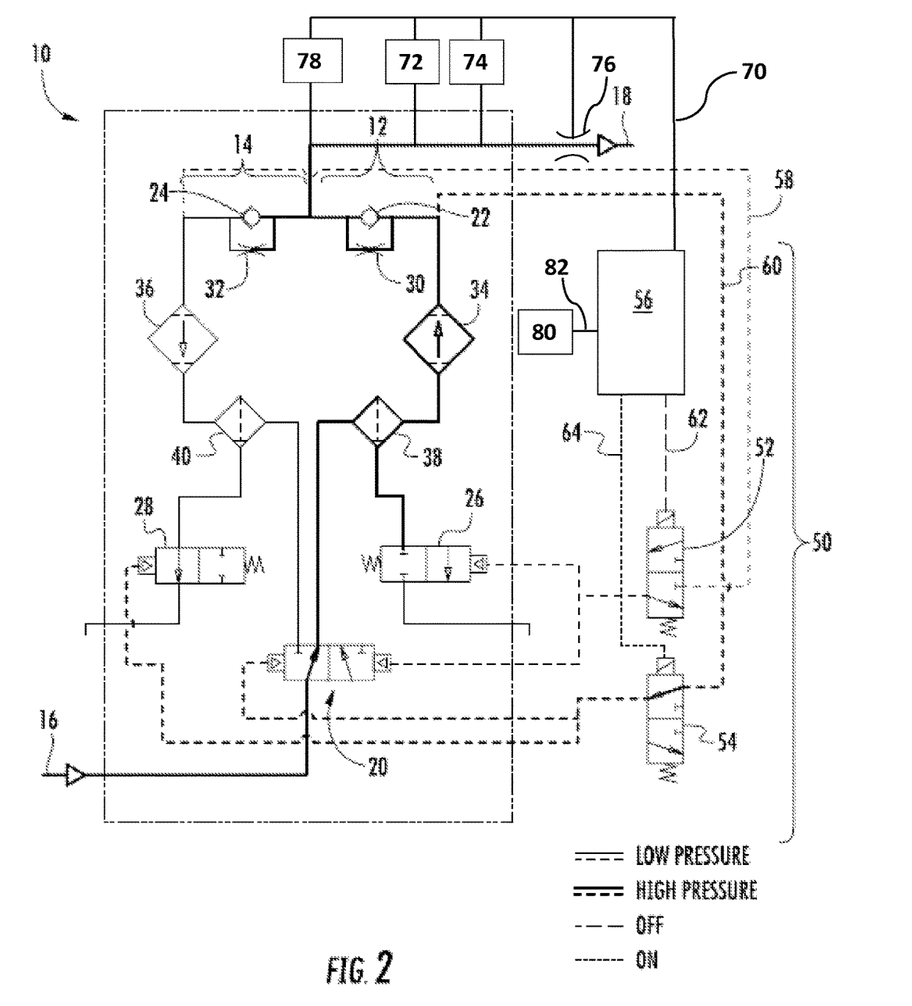
FIG. 2 is a schematic diagram of the air dryer shown in FIG. 1 during normal operation with the right flow path drying compressed air and the left flow path purging.

FIG. 2 shows the air dryer 10 at the beginning of a first flow path 12 drying cycle when the first flow path 12 is drying the air and the second flow path 14 is purging moisture through the second exhaust valve 28. As shown in FIG. 2, the diverter valve 20 is in the first position so that the compressed air may flow from the inlet 16, through the diverter valve 20, and into the first flow path 12. The first control signal 62 is OFF during the entire first flow path 12 drying cycle, so the first control air valve 52 is shut, and the first exhaust valve 26 is shut. As a result, the compressed air flows through the first coalescing filter 38 and first desiccant chamber 34 to remove moisture and particulate from the compressed air. The removed moisture collects in the first coalescing filter 38. The cleaned and dried compressed air then flows through the first check valve 22 and first bypass orifice 30 and exits the air dryer 10 through the outlet 18.

The second sensing line 60 communicates pressure from upstream of the first check valve 22 to the second control air valve 54. At the beginning of the first flow path 12 drying cycle, the second control signal 64 is ON to actuate the solenoid on the second control air valve 54. As a result, the second control air valve 54 opens to provide control air from upstream of the first check valve 22 to the diverter valve 20 and the second exhaust valve 28. The control air maintains the diverter valve 20 in the first position and opens the second exhaust valve 28. The second check valve 24 prevents the cleaned and dried compressed air from entering the second flow path 14. However, the second bypass orifice 32 allows a portion of the cleaned and dried air to flow backwards through the second desiccant chamber 36 and second coalescing filter 40 to purge moisture from the second coalescing filter 40 through the open second exhaust valve 28.

Figure 3:
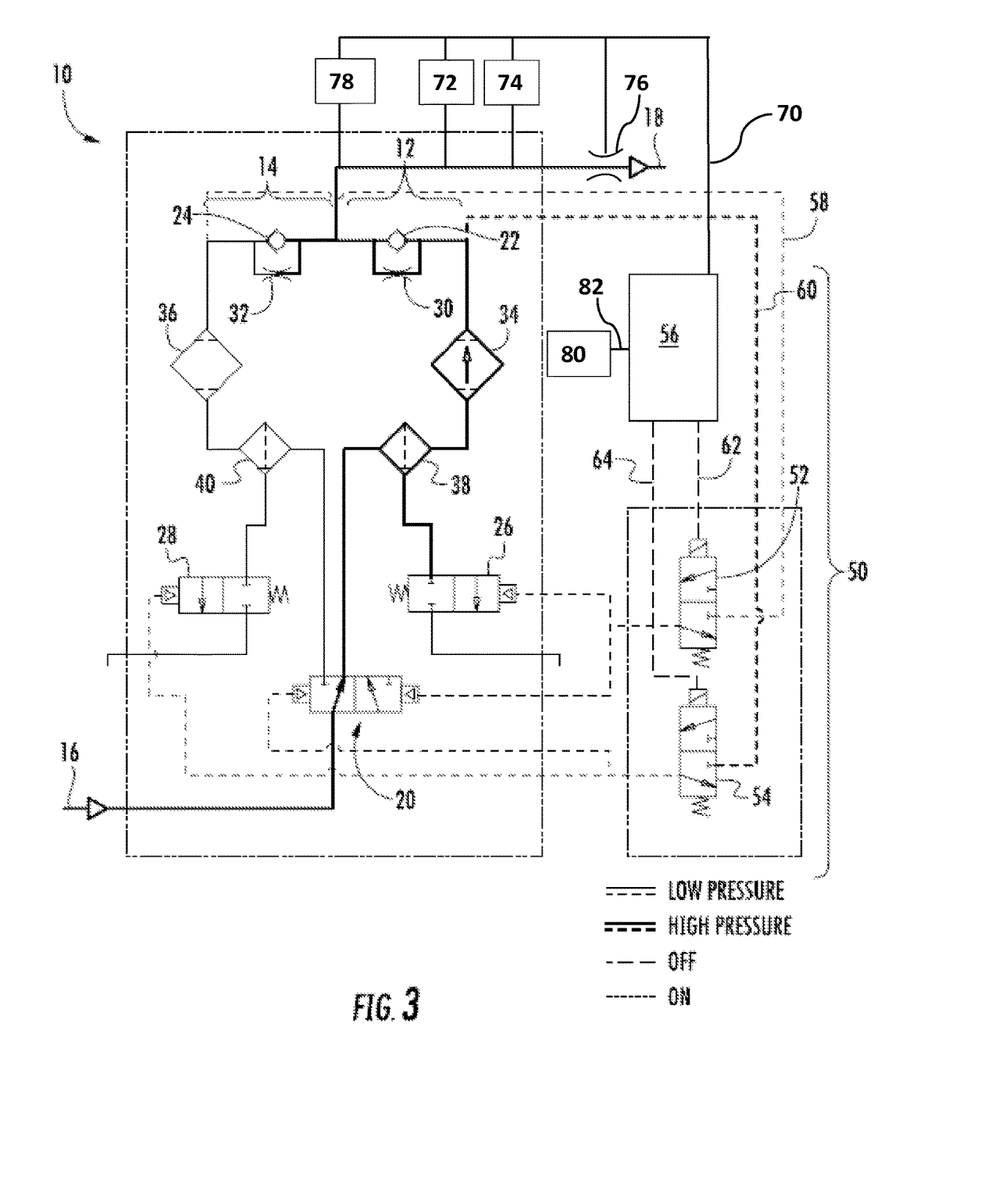
FIG. 3 is a schematic diagram of the air dryer shown in FIG. 1 during normal operation with the right flow path drying compressed air and the left flow path pressurizing.

FIG. 3 shows the first flow path 12 drying cycle after the purge time is complete and the controller 56 turns the second control signal 64 OFF to allow the second flow path 14 to pressurize. When the second control signal 64 is OFF, the second control air valve 54 shuts, removing control air pressure from the diverter valve 20 and the second exhaust valve 28. Without control air pressure, the diverter valve 20 remains in the first position, and the second exhaust valve 28 shuts. With the second exhaust valve 28 shut, the cleaned and dried compressed air flowing through the second bypass orifice 32 increases pressure in the second flow path 14 and in the first sensing line 58 that provides fluid communication to the first control air valve 52. The air dryer 10 is now ready to switch to a second flow path 14 drying cycle, as shown in FIG. 4.

Figure 4:
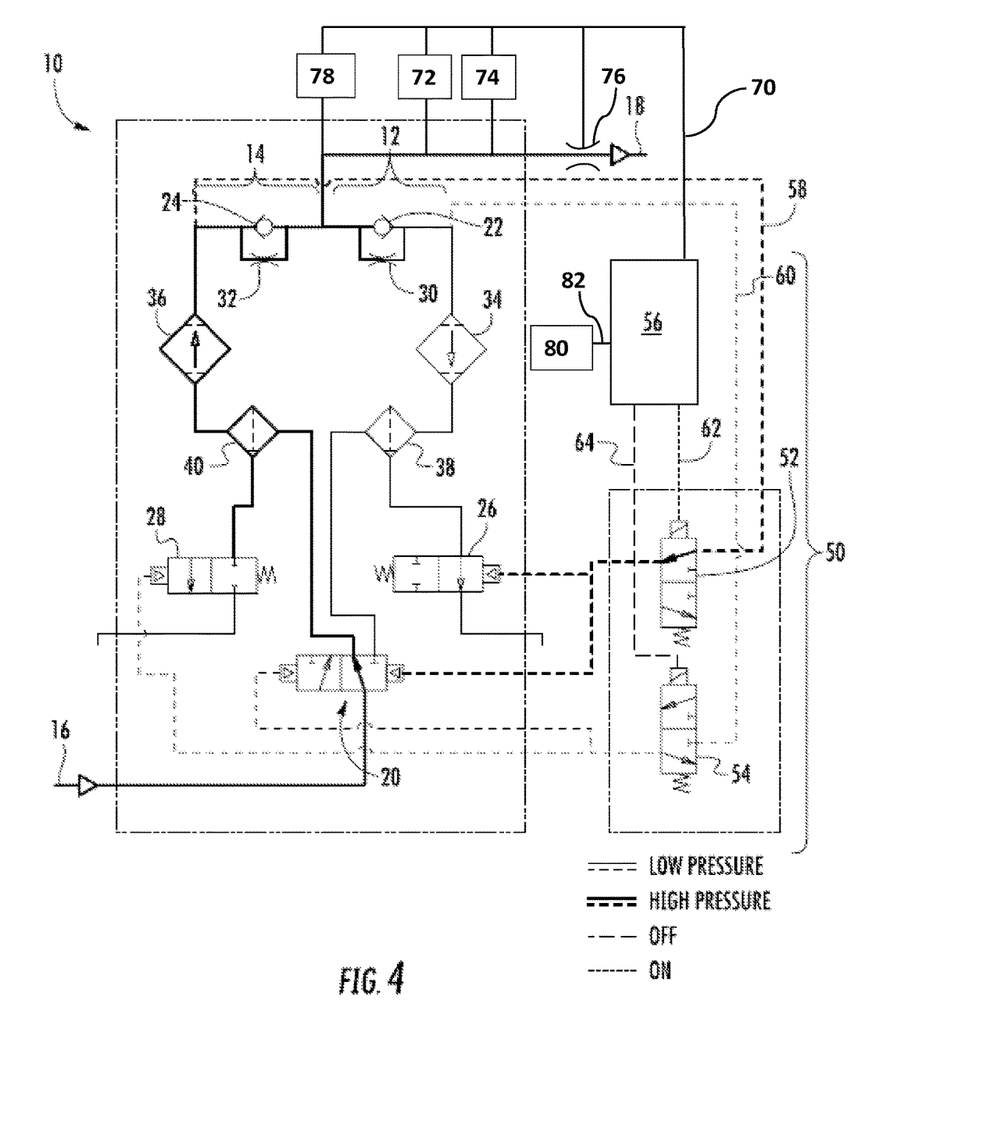
FIG. 4 is a schematic diagram of the air dryer shown in FIG. 1 during normal operation with the left flow path drying compressed air and the right flow path purging.

At the end of the first flow path 12 drying cycle, the controller 56 switches the air dryer 10 to the second flow path 14 drying cycle, as shown in FIG. 4. At the beginning of the second flow path 14 drying cycle, the controller 56 turns the first control signal 62 ON to actuate the solenoid on the first control air valve 52. As a result, the first control air valve 52 opens, and the first sensing line 58 communicates pressure from upstream of the second check valve 24, through the first control air valve 52, to the diverter valve 20 and the first exhaust valve 28. The control air moves the diverter valve 20 to the second position and opens the first exhaust valve 26. In the second position, the diverter valve 20 allows the compressed air to flow from the inlet 16, through the diverter valve 20, and into the second flow path 14. The second control signal 64 is OFF during the entire second flow path 14 drying cycle, so the second control air valve 54 is shut, and the second exhaust valve 28 is shut. As a result, the compressed air flows through the second coalescing filter 40 and second desiccant chamber 36 to remove moisture and particulate from the compressed air. The removed moisture collects in the second coalescing filter 40. The cleaned and dried compressed air then flows through the second check valve 24 and second bypass orifice 32 and exits the air dryer 10 through the outlet 18.

The first check valve 22 prevents the cleaned and dried compressed air from entering the first flow path 12. However, the first bypass orifice 30 allows a portion of the cleaned and dried air to flow backwards through the first desiccant chamber 34 and first coalescing filter 38 to purge moisture from the first coalescing filter 38 through the open first exhaust valve 26.

Figure 5:
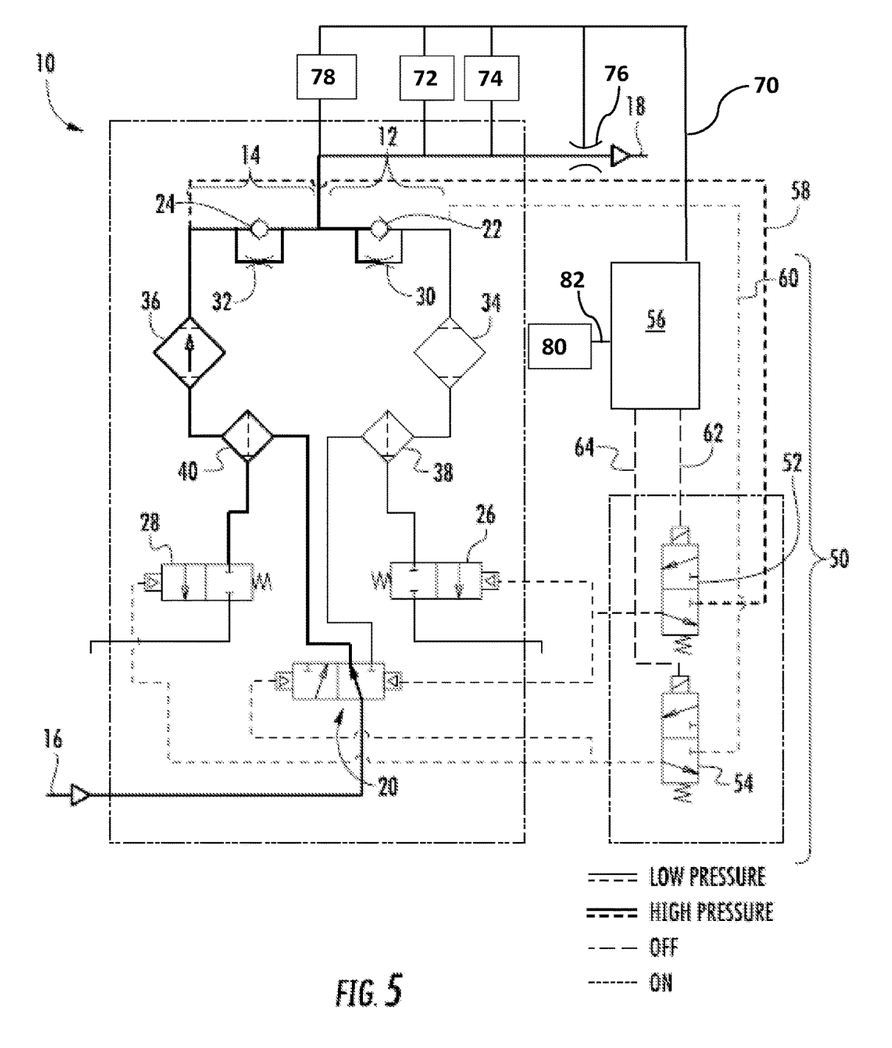
FIG. 5 is a schematic diagram of the air dryer shown in FIG. 1 during normal operation with the left flow path drying compressed air and the right flow path pressurizing.

FIG. 5 shows the second flow path 14 drying cycle after the purge time is complete and the controller 56 turns the first control signal 62 OFF to allow the first flow path 12 to pressurize. When the first control signal 62 is OFF, the first control air valve 52 shuts, removing control air pressure from the diverter valve 20 and the first exhaust valve 26. Without control air pressure, the diverter valve 20 remains in the second position, and the first exhaust valve 26 shuts. With the first exhaust valve 26 shut, the cleaned and dried compressed air flowing through the first bypass orifice 30 increases pressure in the first flow path 12 and in the second sensing line 60 that provides fluid communication to the second control air valve 54. The air dryer 10 is now ready to switch back to the first flow path 12 drying cycle, as shown in FIG. 2.

The cycle time between the parallel flow paths and the purge time of the filters and moisture separators directly affect the anticipated lifetime of the air dryer 10 components as well as the overall efficiency and performance of the air dryer 10. If the cycle time is too long, the filters and moisture separators in the on-line flow path may become excessively saturated with particulates and moisture, adversely affecting the performance of the air dryer 10. Conversely, if the cycle time is too short, the increased switching between parallel flow paths will result in excessive wear to the valves and other moving components in the air dryer 10. Similarly, an excessively long purge time wastes compressed air, and an insufficient purge time may not adequately regenerate the filters and moisture separators.

In particular embodiments, the air dryer 10 may monitor fluid flow through the air dryer 10 to optimize the cycle time and/or purge time. For example, a shorter cycle time may be appropriate during or following transient operations involving increased fluid flow through the air dryer 10 and/or that produce fluid flow out of the air dryer 10 having higher humidity. Alternately or in addition, a longer purge time may be appropriate during or following transient operations that produce fluid flow out of the air dryer 10 having higher humidity. As a result, the embodiments shown in FIGS. 1-5 may monitor and utilize one or more operating conditions to adjust the cycle time and/or purge time of the air dryer 10 to enhance the quality of air produced and/or reduce energy consumption by the air dryer 10.

As shown in FIGS. 1-5, the air dryer 10 may include one or more sensors that monitor operating conditions of the air dryer 10 and produce a system parameter signal 70 reflective of fluid flow through the air dryer 10. The sensors may include, for example, a temperature sensor 72, a pressure sensor 74, a differential pressure sensor 76, and/or a humidity sensor 78. As a result, the system parameter signal 70 may be reflective of one or more of the temperature, pressure, differential pressure, or humidity of fluid flow through the air dryer 10. The sensors may be operably connected to any portion of the air dryer 10 to detect and measure a particular operating condition of the air dryer 10. In the particular embodiment shown in FIGS. 1-5, for example, the sensors are operably connected to the outlet 18 of the air dryer 10 to reflect conditions of the fluid flow exiting the air dryer 10. However, one of ordinary skill in the art will appreciate that the sensors may be operably connected to other locations of the air dryer 10, and the present invention is not limited to any particular location of the sensors unless specifically recited in the claims.

The controller 56 receives the system parameter signal 70 and produces one or more of the control signals 62, 64 based on the system parameter signal 70. As previously described, the control signals 62, 64 actuate the solenoids on the first and second control air valves 52, 54, respectively, to control the position of the diverter valve 20, the first exhaust valve 26, and the second exhaust valve 28. In this manner, the system parameter signal 70 allows the controller 56 to adjust the cycle time and/or purge time based on the actual operating conditions of the air dryer 10. For example, the controller 56 may calculate the volume of fluid flow through the air dryer 10 based on the temperature, pressure, and differential pressure and reduce the cycle time during transient conditions of increased fluid flow through the air dryer 10. Alternately or in addition, the controller 56 may reduce the cycle time and/or increase the purge time based on increased humidity of fluid flow through the air dryer 10.

In particular embodiments, the air dryer 10 may monitor ambient temperature around the air dryer 10 to optimize the purge time and reduce energy consumption by the air dryer 10. For example, a decrease in ambient temperature produces increased condensation of moisture in the fluid flow. As a result, a longer purge time may be appropriate during or following a decrease in ambient temperature.

As shown in FIGS. 1-5, the air dryer 10 may include an ambient temperature sensor 80 that produces an ambient temperature signal 82. The controller 56 receives the ambient temperature signal 82 and produces one or more of the control signals 62, 64 based on the ambient temperature signal 82. As previously described, the control signals 62, 64 actuate the solenoids on the first and second control air valves 52, 54, respectively, to control the position of the diverter valve 20, the first exhaust valve 26, and the second exhaust valve 28. In this manner, the ambient temperature signal 82 allows the controller 56 to adjust the purge time based on the ambient temperature around the air dryer 10. For example, the controller 56 may increase the purge time during or following a decrease in ambient temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An air dryer, comprising:
a first flow path through the air dryer;
a second flow path through the air dryer in parallel with the first flow path;
a first exhaust value in the first flow path, wherein the first exhaust valve has an open position that permits fluid flow out of the flow path and a shut position that prevents fluid flow out of the first flow path;
a second exhaust valve in the second flow path, wherein the second exhaust valve has an open position that permits flow out of the second flow path and a shut position that prevents fluid flow out of the second flow path;
a diverter valve having a first position that provides fluid communication to the first flow path and a second position that provides fluid communication to the second flow path;
a system parameter signal reflective of fluid flow through the air dryer;
a controller that receives the system parameter signal and produces a control signal based on the system parameter signal; and
wherein the control signal controls the position of the diverter valve and at least one of the first or second exhaust valves.

2. The air dryer as in claim 1, wherein the system parameter signal is reflective of a temperature, a pressure, and a differential pressure of fluid flow through the air dryer.

3. The air dryer as in claim 1, wherein the system parameter signal is reflective of a humidity of fluid flow through the air dryer.

4. The air dryer as in claim 1, further comprising an ambient temperature signal, and the controller receives the ambient temperature signal and produces the control signal based on the ambient temperature signal.

5. The air dryer as in claim 1, further comprising an interlock operably connected to the diverter valve and the first and second exhaust valves, wherein the interlock prevents positioning the diverter valve to the first position when the first exhaust valve is in the open position and prevents positioning the diverter valve to the second position when the second exhaust valve is in the open position.

6. An air dryer, comprising:
a first flow path through the air dryer;
a first exhaust valve in the first flow path, wherein the first exhaust valve has an open position that permits fluid flow out of the first flow path and a shut position that prevents fluid flow out of the first flow path;
a second flow path through the air dryer in parallel with the first flow path;
a second exhaust valve in the second flow path, wherein the second exhaust valve has an open position that permits fluid flow out of the second flow path and a shut position that prevents fluid flow out of the second flow path;
a system parameter signal reflective of fluid flow through the air dryer;
a controller that receives the system parameter signal and produces a control signal based on the system parameter signal; and
wherein the control signal controls the position of at least one of the first or second exhaust valves.

7. The air dryer as in claim 6, wherein the system parameter signal is reflective of a humidity of fluid flow through the air dryer.

8. The air dryer as in claim 6, further comprising an ambient temperature signal, and the controller receives the ambient temperature signal and produces the control signal based on the ambient temperature signal.

9. The air dryer as in claim 8, further comprising a diverter valve having a first position that provides fluid communication to the first flow path and a second position that provides fluid communication to the second flow path.

10. The air dryer as in claim 9, wherein the control signal controls the position of the diverter valve.

11. The air dryer as in claim 10, wherein the system parameter signal is reflective of a temperature, a pressure, and a differential pressure of fluid flow through the air dryer.

12. The air dryer as in claim 9, further comprising an interlock operably connected to the diverter valve and the first and second exhaust valves, wherein the interlock prevents positioning the diverter valve to the first position when the first exhaust valve is in the open position and prevents positioning the diverter valve to the second position when the second exhaust valve is in the open position.

13. An air dryer, comprising:
   a first flow path through the air dryer, wherein the first flow path comprises a first exhaust valve having an open position that permits fluid flow out of the first flow path and a shut position that prevents fluid flow out of the first flow path;
   a second flow path through the air dryer in parallel with the first flow path, wherein the second flow path comprises a second exhaust valve having an open position that permits fluid flow out of the second flow path and a shut position that prevents fluid flow out of the second flow path;
   a diverter valve having a first position that provides fluid communication to the first flow path and a second position that provides fluid communication to the second flow path;
   a system parameter signal reflective of fluid flow through the air dryer;
   a controller that receives the system parameter signal and produces a control signal based on the system parameter signal;
   wherein the control signal controls the position of at least one of the diverter valve, the first exhaust valve, or the second exhaust valve; and
   wherein the system parameter signal is reflective of a temperature, a pressure, and a differential pressure of fluid flow through the air dryer.

14. The air dryer as in claim 13, wherein the system parameter signal is reflective of a humidity of fluid flow through the air dryer.

15. The air dryer as in claim 13, further comprising an ambient temperature signal, and the controller receives the ambient temperature signal and produces the control signal based on the ambient temperature signal.

16. The air dryer as in claim 13, further comprising an interlock operably connected to the diverter valve and the first and second exhaust valves, wherein the interlock prevents positioning the diverter valve to the first position when the first exhaust valve is in the open position and prevents positioning the diverter valve to the second position when the second exhaust valve is in the open position.

* * * * *